US012152422B2

(12) United States Patent
Fairchild et al.

(10) Patent No.: US 12,152,422 B2
(45) Date of Patent: *Nov. 26, 2024

(54) SLIDER FOR WINDOW REGULATOR WITH ADJUSTMENT MECHANISM

(71) Applicant: Brose Fahrzeugteile SE & Co. Kommanditgesellschaft, Bamberg, Bamberg (DE)

(72) Inventors: Brian Fairchild, Oxford, MI (US); James Trevarrow, Sun City West, AZ (US); Chase Reames, Fenton, MI (US)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/524,887

(22) Filed: Nov. 12, 2021

(65) Prior Publication Data

US 2023/0151664 A1 May 18, 2023

(51) Int. Cl.
*E05D 15/16* (2006.01)
*E05F 15/689* (2015.01)

(52) U.S. Cl.
CPC .......... *E05D 15/165* (2013.01); *E05F 15/689* (2015.01); *E05Y 2201/434* (2013.01); *E05Y 2201/64* (2013.01); *E05Y 2201/654* (2013.01); *E05Y 2201/684* (2013.01); *E05Y 2600/10* (2013.01); *E05Y 2900/55* (2013.01)

(58) Field of Classification Search
CPC ........... E05Y 2201/434; E05Y 2201/64; E05Y 2201/654; E05Y 2201/684; E05Y 2600/10; E05Y 2900/55; E05D 15/165; E05D 15/689
USPC .................................................... 49/374, 375
See application file for complete search history.

(56) References Cited

U.S. PATENT DOCUMENTS 4,051,632 A 10/1977 Fukumoto et al.
4,848,032 A 7/1989 Ballor
(Continued)

FOREIGN PATENT DOCUMENTS

DE 102011085741 A1 5/2013
DE 202022101779 U1 * 8/2022 ............. B60J 1/006
(Continued)

OTHER PUBLICATIONS

International Search Report and Written Opinion for PCT/EP2022-081579, mailing date of Feb. 23, 2023, All together 11 Pages.

*Primary Examiner* — Jerry E Redman
(74) *Attorney, Agent, or Firm* — Dickinson Wright PLLC

(57) ABSTRACT

An adjustable slider of a window regulator includes a base body configured to connect with a cable of the window regulator and a clamp-plate assembly having first and second jaws configured to clamp a windowpane therebetween. A hinge plate supports the clamp-plate assembly. A first adjustment mechanism pivotally connects the hinge plate to the base body such that the clamp-plate assembly and the hinge plate are pivotal relative to the base body allowing a vertical angle of the clamp-plate assembly to be changed. The first adjustment mechanism is actuatable to move the hinge plate relative to the base body in a fore-and-aft direction allowing a fore-and-aft position of the clamp-plate assembly to be adjusted.

19 Claims, 4 Drawing Sheets

(56) References Cited

U.S. PATENT DOCUMENTS

| | | | | | |
|---|---|---|---|---|---|
| 5,987,820 | A * | 11/1999 | Shibanushi | E05F 11/385 | 49/358 |
| 6,453,617 | B1 * | 9/2002 | Klippert | E05F 11/385 | 49/375 |
| 8,096,080 | B2 * | 1/2012 | Pavlovic | E05F 11/488 | 49/374 |
| 8,701,347 | B2 * | 4/2014 | Hampel | E05F 11/382 | 49/374 |
| 10,876,344 | B2 * | 12/2020 | Taubmann | E05F 11/385 | |
| 11,162,291 | B2 * | 11/2021 | Reames | E05F 11/488 | |
| 11,168,501 | B2 * | 11/2021 | Pavlovic | E05D 15/165 | |
| 11,377,892 | B2 * | 7/2022 | Hampel | E05F 11/385 | |
| 2005/0268558 | A1 | 12/2005 | Cardine et al. | | |
| 2007/0022665 | A1 * | 2/2007 | Bigourden | E05F 11/385 | 49/375 |
| 2009/0007494 | A1 * | 1/2009 | Pavlovic | E05F 11/488 | 49/348 |
| 2010/0043297 | A1 * | 2/2010 | Barr | E05F 11/385 | 24/458 |
| 2010/0313481 | A1 * | 12/2010 | Brownlie, Jr. | E05F 11/385 | 49/372 |
| 2018/0326820 | A1 * | 11/2018 | Huang | E05F 11/385 | |
| 2020/0173212 | A1 * | 6/2020 | Pavlovic | E05F 11/385 | |
| 2020/0338965 | A1 * | 10/2020 | Barr | E05D 15/165 | |
| 2020/0386026 | A1 * | 12/2020 | Reames | E05F 11/385 | |
| 2023/0151664 | A1 * | 5/2023 | Fairchild | E05F 15/689 | 49/360 |

FOREIGN PATENT DOCUMENTS

| | | | |
|---|---|---|---|
| FR | 2979289 | A1 | 3/2013 |
| WO | 2020220021 | A1 | 10/2020 |

* cited by examiner

SLIDER FOR WINDOW REGULATOR WITH ADJUSTMENT MECHANISM

TECHNICAL FIELD

The present disclosure relates to window regulators for use in motor vehicles and more particularly to an adjustable slider of the window regulator.

BACKGROUND

Vehicles may include power windows operated by a window lifter or window regulator. The window regulator is configured to support and carry a windowpane between a first position, e.g, a bottom position, disposed within a cavity of the door or other vehicle member, and a second position e.g, top position, engaged with an upper portion of the door or roof Window regulators used in vehicle doors that do not include an upper member that receives the windowpane may be referred to as a frameless window regulator assembly. Frameless window regulator assemblies are generally used in convertibles or other vehicles that include a windowpane that engages a roof rail.

SUMMARY

According to one embodiment, an adjustable slider of a window regulator includes a base body configured to connect with a cable of the window regulator and a clamp-plate assembly having first and second jaws configured to clamp a windowpane therebetween. A hinge plate supports the clamp-plate assembly. A first adjustment mechanism pivotally connects the hinge plate to the base body such that the clamp-plate assembly and the binge plate are pivotal relative to the base body allowing a vertical angle of the clamp-plate assembly to be changed. The first adjustment mechanism is actuatable to move the hinge plate relative to the base body in a fore-and-aft direction allowing a fore-and-aft position of the clamp-plate assembly to be adjusted.

The adjustable slider may further include a second adjustment mechanism connected between the base body and the hinge plate. The second adjustment mechanism is actuatable to pivot the hinge plate relative to the base body allowing adjustment of the vertical angle. The base body may have an upper portion supporting the first adjustment mechanism and a lower portion connected to the second adjustment mechanism. The second adjustment mechanism may be operable to move a lower portion of the hinge plate towards and away from the lower portion of the base body to pivot the binge plate. The upper portion of the base body may define a hole, and the hinge plate may define a hoop, wherein the first adjustment mechanism includes an elongate member extending through the hole and the hoop to pivotally connect the hinge plate to the base body. The hole and the elongate member threadably engage.

According to one or more aspects of this disclosure, the base body may define a threaded hole and the first adjustment mechanism may include a threaded fastener disposed in the hole, wherein rotation of the fastener moves the hinge plate relative to the base body in the fore-and-aft direction. For example, the hinge plate has a pair of loops that are spaced apart and the threaded hole is disposed between the loops and the fastener extends through the loops.

According to one or more further aspects of this disclosure, the base body defines a through hole that is elongated in the fore-and-aft direction, and further includes a fastener extending through the first jaw, the second jaw, and the hinge plate and disposed within the through hole.

According to another embodiment, an adjustable slider includes a base body configured to connect with a cable of a window regulator, a clamp-plate assembly configured to support a windowpane, and a first adjustment mechanism configured to move the clamp-plate assembly relative to the base body in a fore-and-aft direction.

According to yet another embodiment, a window regulator includes a guide rail, a cable supported on the guide rail, an actuator operably coupled to the cable and configured to move the cable relative to the guide rail, and a slider fixed on the cable and slidably connected to the guide rail. The slider includes a base body configured to connect with the cable, a clamp-plate assembly configured to support a windowpane, and a first adjustment mechanism configured to move the clamp-plate assembly relative to the base body in a fore-and-aft direction.

DETAILED DESCRIPTION

Figure 1:
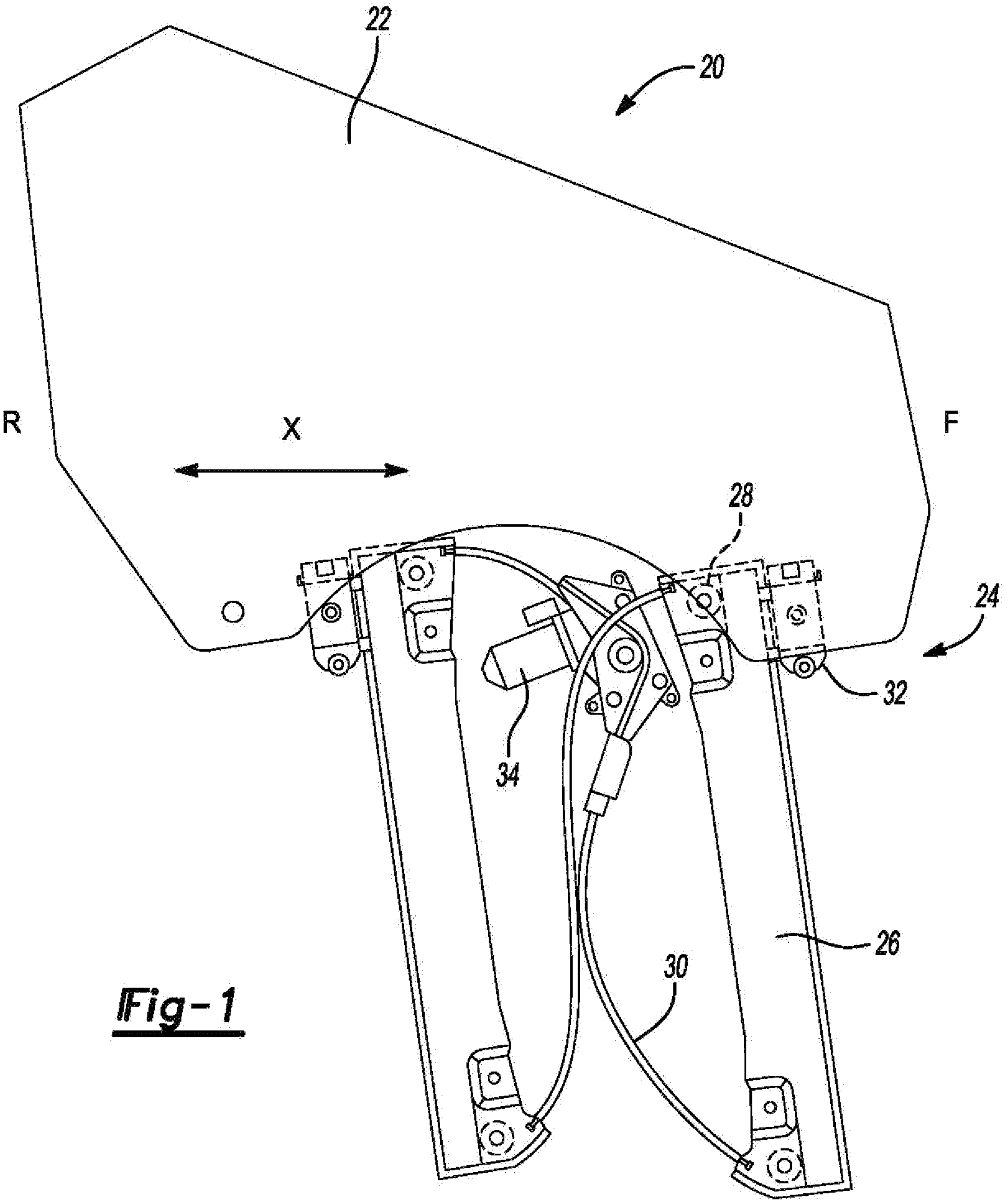
FIG. 1 is a perspective view of a window assembly of a vehicle.

Embodiments of the present disclosure are described herein. It is to be understood, however, that the disclosed embodiments are merely examples and other embodiments, can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing, from the teachings of the example embodiments.

The terms "front," "rear," "upper" and "lower" designate directions in the drawings to which reference is made. The terms, connected, attached, etc., refer to directly or indirectly connected, attached, etc., unless otherwise indicated explicitly or by context.

Window regulators may include one or more guide rails and a slider that may move or translate along the guide rails to adjust a windowpane. Frameless window regulators or window regulators configured to move a windowpane that does not engage an upper door rail or member may present a number of challenges that may not be associated with conventional window regulators. For example, the relative angular position of the windowpane may vary with respect to one or more mating features, such as a roof rail, a seal, or both that are each configured to receive the windowpane when the windowpane is in a top or uppermost position. If the angular position of the windowpane is greater than a predetermined tolerance, the windowpane and the seal may not form a sufficient seal.

Generally, one manufacturer may assemble and ship the window regulator to a vehicle integrator or original equipment manufacturer (OEM) that assembles the windowpane to the window regulator and the window regulator and glass to the associated vehicle component, e.g., door. Because an insufficient seal or fit between the windowpane and the mating seal or frame member may not be discovered until after the window regulator is shipped and assembled to the vehicle, it may be desirable to provide one or more adjustment mechanisms to adjust the vertical angle of the windowpane as well as the fore-and-aft position. This adjustment(s) may be made by the manufacturer of the window regulator, the OEM, or both. The OEM may inform the window regulator manufacturer of the desired angle or required adjustment so that the manufacturer may set the set these parameters of the slider prior to shipping the window regulators.

Referring to FIG. 1, a perspective view of an exemplary vehicle window assembly 20 is shown. The window assembly 20 includes a windowpane 22 that is opened and closed by a window regulator 24 typically installed within a vehicle door. The window regulator 24 may include one or more guide rails 26 (such as two) that may extend in a vertical direction with respect to the vehicle (not shown). One or more pulleys 28 may be pivotally coupled to the guide rails 26 and one or more cables 30 may be wound around the pulleys 28. Adjustable sliders 32 may be supported on the guide rails 26 and attached to one or more of the cables 30 such that the sliders and cables are fixed. While a window assembly provided with guide rails is illustrated, the adjustable sliders 32 as described herein may be used in an integrated window regulator. As an example, applicant's co-pending application Ser. No. 16/917,305 describes an exemplary integrated window regulator and is hereby incorporated by reference herein in its entirety.

An actuator 34, such as an electric motor, drives the cables to adjust the sliders 32 up and down along the guide rails 26. The sliders 32 connect to and directly support the windowpane 22. The windowpane 22 is opened and closed within a vehicle by operating the electric motor. Operating the electric motor 34 in a first direction causes the sliders 32 to move downwardly to open the window, and operating the electric motor 34 and a second direction causes the sliders to move upwardly to close the window as is known in the art.

Figure 2:
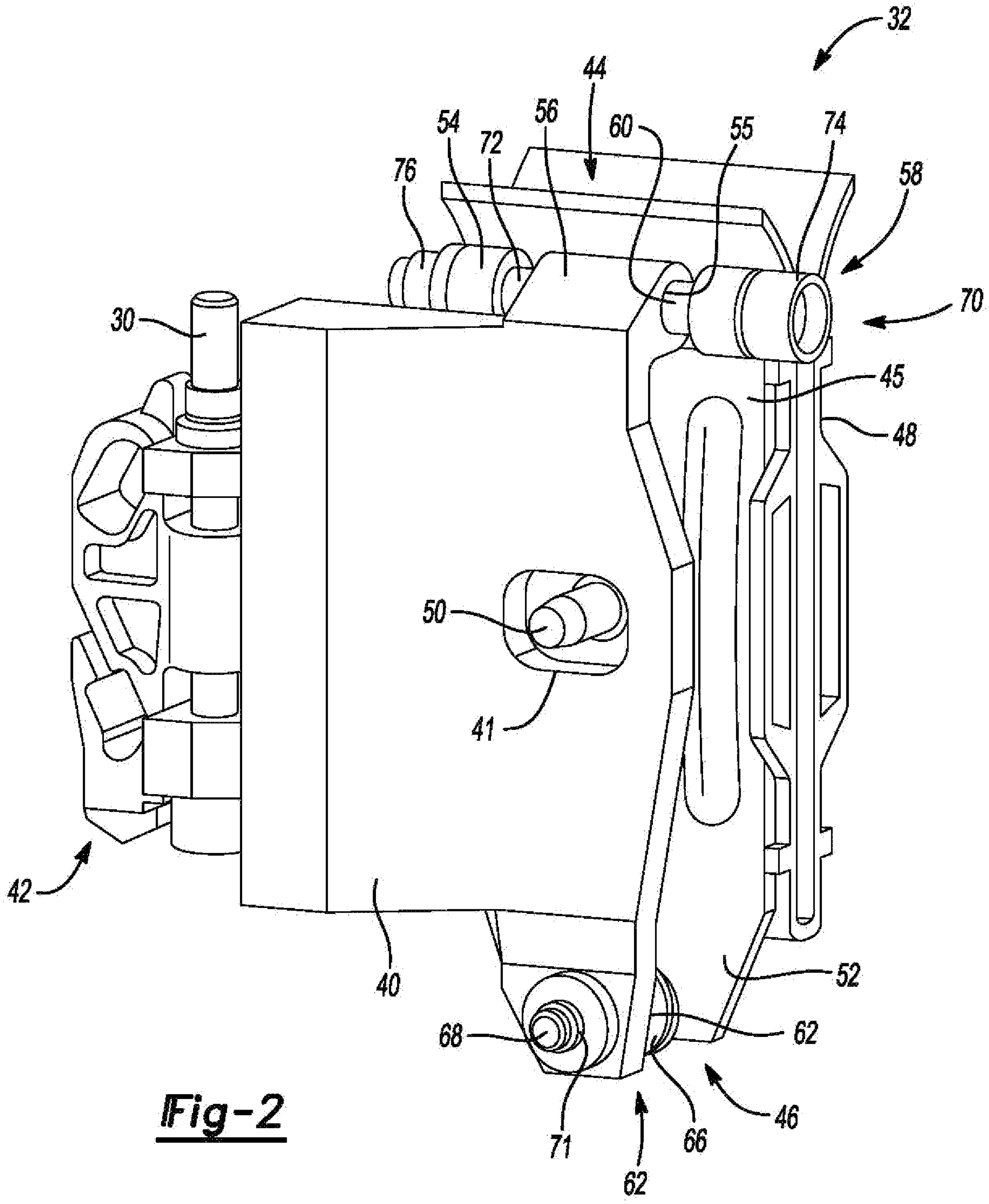
FIG. 2 is a front perspective view of an adjustable slider of a window regulator.
Figure 3:
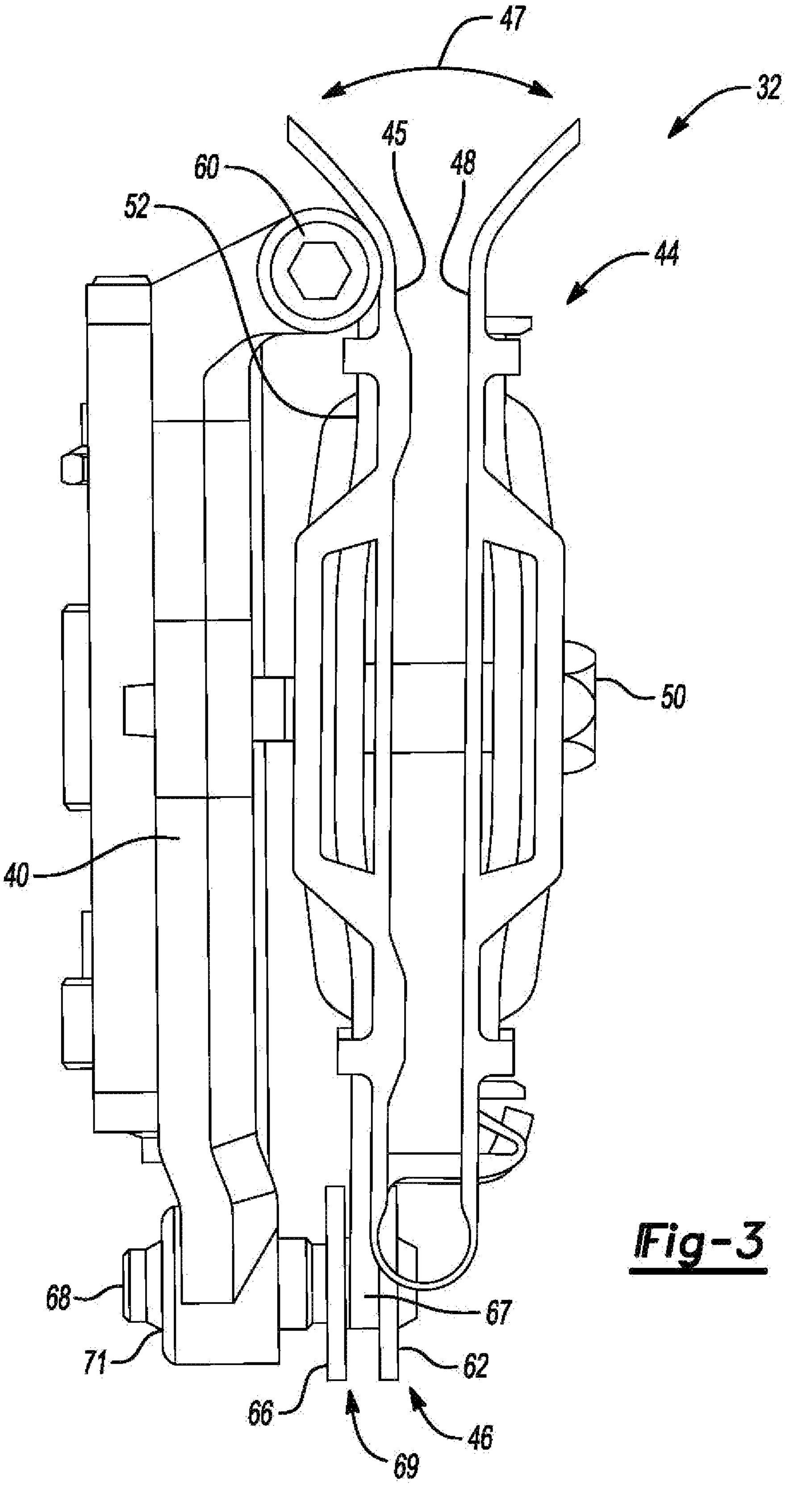
FIG. 3 is a side view of the adjustable slider.
Figure 4:
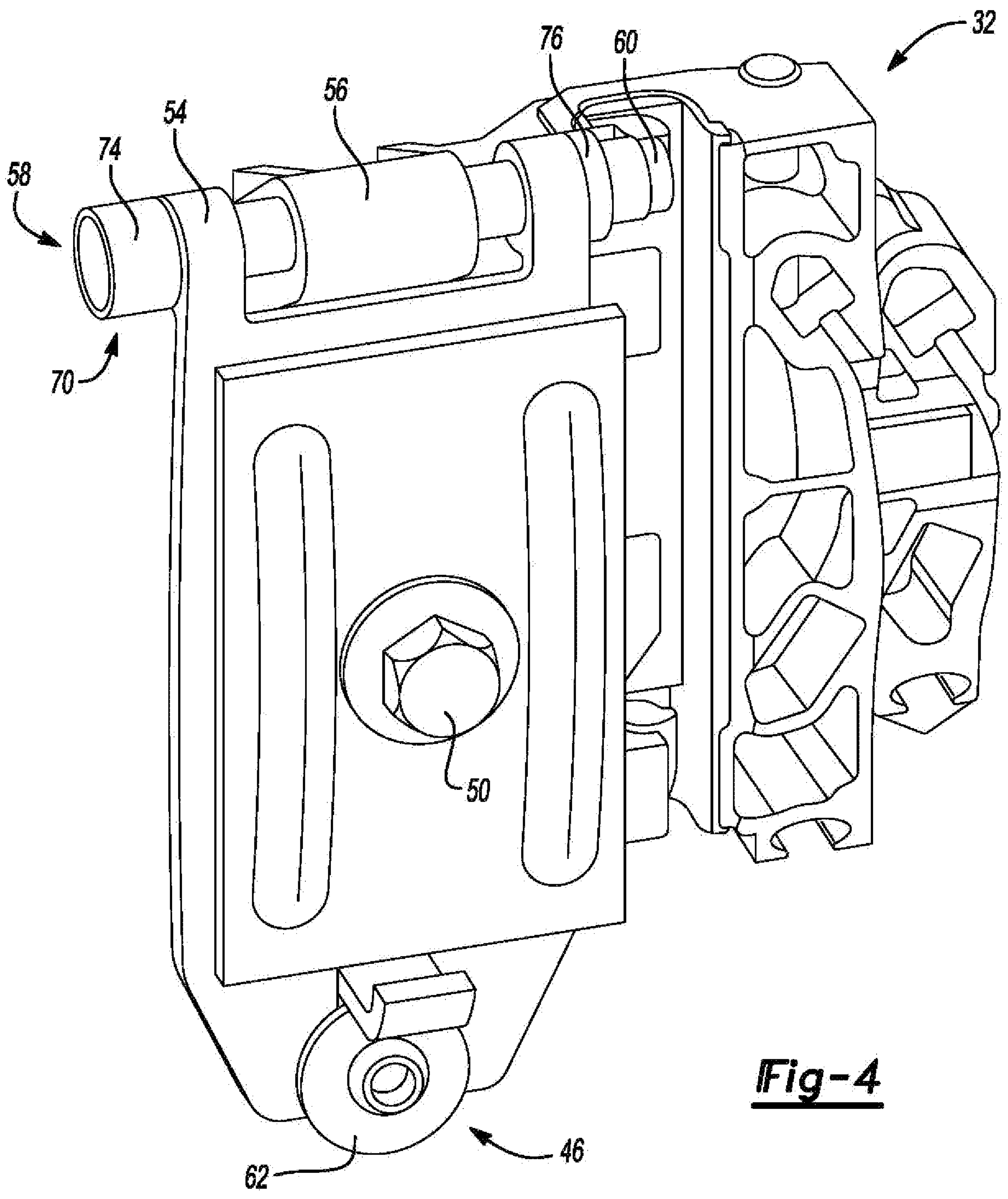
FIG. 4 is a back perspective view of the adjustable slider with the jaws omitted for illustrative purposes.

Referring to FIGS. 2, 3, and 4, the slider 32 includes a base body 40 connected to the cable 30 by a connection feature 42. The connection feature is configured to attach with the cable 30 such that the slider 32 is fixed relative to the cable 30 so that movement of the cable translates the slider 32 along the guide rail. The base body 40 supports a clamp-plate assembly 44 configured to connect with the windowpane. The assembly 44 may include a first jaw 45 and a second jaw 48 that may generally extend in a vertical direction. The first and second jaws 45, 48 are configured to engage opposite sides of the windowpane and secure the windowpane to the slider 32. A fastener 50 may extend through the assembly 44 and the windowpane to further secure the windowpane to the slider 32. The base body 40 defines a through hole 41 that is elongated in the fore-and-aft direction allowing clearance for movement of the fastener 50.

A first adjustment mechanism 46 is configured to change the angle or pitch 47 of the clamp-plate assembly 44 relative to the vertical axis to adjust the pitch of the windowpane to ensure proper fit in the vehicle. This may be referred to herein as the "vertical angle." The clamp-assembly 44 may be pivotally connected to the base body 40 by a hinge plate 52. The hinge plate 52 may include loops 54 that are pivotally attached to an upper portion 56 of the base body 40 by a pin assembly 58. The pin assembly 58 includes an elongate member 60 that extends through the loops 54 and a hole 55 defined through the upper portion 56. Pivoting of the hinge plate 52 about the elongate member 60 pivots the clamp-plate assembly 44 to adjust the vertical angle 47.

The first adjustment mechanism 46, according to one or more embodiments, may include a fastener assembly 62 located at a lower portion of the slider 32. The fastener assembly 62 includes a shoulder 66 that secures to a lower portion 67 of the hinge plate 52. For example, the shoulder 66 may define a groove 69 that receives the lower portion 67 therein. The shoulder 66 is supported on (or integral with) an adjustment screw 68 that is threadably received through a threaded hole 71 of the base body 40 in the illustrated example. Rotation of the adjustment screw 68 moves the lower portion of the hinge plate 52 towards or away from the base body 40 and pivots the jaws 45, 48 about the elongate member 60. Rotation of the screw 68 in a first direction moves the lower portion 67 towards the base body 40, and rotation of the screw 68 and a second direction moves the lower portion 67 away from the base body 40.

The adjustment mechanism 46 is not limited to the illustrated embodiment. For example, Applicant's issued patent U.S. Pat. No. 11,162,291 (issued Nov. 2, 2021), the contents of which are hereby incorporated by reference herein in their entirety, describes another adjustment mechanism that may be used to adjust the pitch of the jaws.

The slider 32 includes a second adjustment mechanism 70 that allows the windowpane to be adjusted in the fore-and-aft direction of the vehicle. The second adjustment mechanism 70 is configured to move the clamp-plate assembly 44 relative to the base body 40 in the fore-and-aft direction.

The second adjustment mechanism 70 may include the elongate member 60. In one or more embodiments, the elongate member 60 is a threaded fastener having a shank 72 and a head 74. The shank 72 may define threads (at least partially), and the head 74 may define a receptacle configured to receive a tool such as an Allen key. The hole 55 may define female threads that engage with the male threads of the fastener 60. The shank 72 extends through the loops 54 and the hole 55. The loops 54 are not threaded. A nut 76 is threadably received on the distal end of the threaded shank 72. The nut 76 is tightened so that the loops 54 are squeezed between the head 74 and the nut 76. This secures the hinge plate 52 to the fastener 60 so that fore-and-aft movement of the fastener 60 moves the hinge plate 52 and consequently moves the windowpane fore-and-aft relative to the guide rails. Rotation of the fastener 60 in a first direction moves the head 74 towards the hole 55 to move the clamp-plate assembly 44 (and the windowpane) to the left in FIG. 2, and rotation of the fastener 60 in a second direction moves the head 74 away from the hole 55 to move the clamp-plate assembly 44 (and the windowpane) to the right in FIG. 2. Slider 32 may be configured for between plus-or-minus 2 and 10 millimeters of fore-and-aft adjustment.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST

40 base body
41 hole
42 connection feature
44 clamp-plate assembly
45 first jaw
46 first adjustment mechanism
47 vertical angle
48 second jaw
50 fastener
52 hinge plate
54 loops
55 hole
56 upper portion
58 pin assembly
60 elongate member
62 fastener assembly
66 shoulder
67 portion
68 adjustment screw
69 groove
70 second adjustment mechanism
71 hole
72 shank
74 head
76 nut While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An adjustable slider of a window regulator, the adjustable slider comprising:
a base body configured to connect with a cable of the window regulator, wherein the base body includes a connection feature configured to attach the cable to the adjustable slider so that movement of the cable translates the adjustable slider along a guide rail;
a clamp-plate assembly including first and second jaws configured to clamp a windowpane therebetween;
a hinge plate supporting the clamp-plate assembly;
a first adjustment mechanism pivotally connecting the hinge plate to the base body such that the clamp-plate assembly and the hinge plate are pivotal relative to the base body allowing a vertical angle of the clamp-plate assembly to be changed, wherein the first adjustment mechanism is actuatable to move the hinge plate relative to the base body in a fore-and-aft direction allowing a fore-and-aft position of the clamp-plate assembly to be adjusted; and
a second adjustment mechanism connected between the base body and the hinge plate, wherein the second adjustment mechanism is actuatable to pivot the hinge plate relative to the base body allowing adjustment of the vertical angle.

2. The adjustable slider of claim 1, wherein the base body includes an upper portion supporting the second adjustment mechanism and a lower portion connected to the first adjustment mechanism.

3. The adjustable slider of claim 2, wherein the second adjustment mechanism is operable to move a lower portion of the hinge plate towards and away from the lower portion of the base body to pivot the hinge plate, wherein the second adjustment mechanism includes a fastener assembly that includes a shoulder secured to a lower portion of the hinge plate, wherein the shoulder defines a groove that receives the lower portion of the hinge plate.

4. The adjustable slider of claim 2, wherein the upper portion of the base body defines a hole, and the hinge plate defines a hoop, and wherein the first adjustment mechanism includes an elongate member extending through the hole and the hoop to pivotally connect the hinge plate to the base body.

5. The adjustable slider of claim 4, wherein the hole and the elongate member threadably engaged.

6. The adjustable slider of claim 1, wherein the base body defines a threaded hole and the first adjustment mechanism includes a threaded fastener disposed in the hole, wherein rotation of the fastener moves the hinge plate relative to the base body in the fore-and-aft direction.

7. The adjustable slider of claim 6, wherein the hinge plate includes a pair of loops that are spaced apart, wherein the threaded hole is disposed between the loops, and the fastener extends through the loops.

8. The adjustable slider of claim 1, wherein the base body defines a through hole that is elongated in the fore-and-aft direction, and further comprising a fastener extending through the first jaw, the second jaw, and the hinge plate and disposed within the through hole.

9. The adjustable slider of claim 1, wherein the hinge plate defines at least one loop and the first adjustment mechanism includes an elongate member extending through the at least one loop.

10. An adjustable slider comprising:

a base body configured to connect with a cable of a window regulator, wherein the base body includes a connection feature configured to attach the cable to the adjustable slider so that movement of the cable translates the adjustable slider along a guide rail;

a clamp-plate assembly configured to support a windowpane; and a first adjustment mechanism configured to move the clamp-plate assembly relative to the base body in a fore-and-aft direction, wherein the first adjustment mechanism is actuatable to move a hinge plate relative to the base body in a fore-and-aft direction allowing a fore-and-aft position of the clamp-plate assembly to be adjusted, wherein the first adjustment mechanism includes a fastener assembly located at a lower portion of the adjustable slider; and a second adjustment mechanism connected between the base body and the hinge plate, wherein the second adjustment mechanism is actuatable to pivot the hinge plate relative to the base body allowing adjustment of the vertical angle, wherein the vertical angle is an angle relative to a vertical axis.

11. The adjustable slider of claim 10, wherein the second adjustment mechanism is configured to adjust a vertical angle of the clamp-plate assembly.

12. The adjustable slider of claim 11, wherein the clamp-plate assembly is pivotal relative to the base body about the first adjustment mechanism.

13. The adjustable slider of claim 12, wherein the first adjustment mechanism includes a fastener that is threadably connected to the base body, and wherein the fastener is rotatable relative to the clamp-plate assembly and is axially stationary relative to the clamp-plate assembly.

14. The adjustable slider of claim 10, wherein the hinge plate that supports the clamp-plate assembly to the base body.

15. The adjustable slider of claim 10, wherein the first adjustment mechanism includes a fastener that is threadably connected to the base body.

16. The adjustable slider of claim 15, wherein the hinge plate that supports the clamp-plate assembly to the base body, wherein the hinge plate is pivotally attached to the base body by the fastener.

17. A window regulator comprising:

a guide rail;

a cable supported on the guide rail;

an actuator operably coupled to the cable and configured to move the cable relative to the guide rail;

a hinge plate supporting a clamp-plate assembly, wherein the hinge plate defines at least one loop and an adjustment mechanism includes an elongate member extending through the at least one loop, wherein the clamp-plate assembly is configured to support a windowpane; and a slider fixed on the cable and slidably connected to the guide rail, the slider including:

a base body configured to connect with the cable, wherein the base body includes a connection feature configured to attach the cable to the slider so that movement of the cable translates the slider along the guide rail, and wherein the adjustment mechanism is configured to move the clamp-plate assembly relative to the base body in a fore-and-aft direction, wherein the adjustment mechanism is actuatable to move the hinge plate relative to the base body in a fore-and-aft direction allowing a fore-and-aft position of the clamp-plate assembly to be adjusted.

18. The window regulator of claim 17, wherein the slider further includes a second adjustment mechanism configured to adjust a vertical angle of the clamp-plate assembly.

19. The window regulator of claim 18, wherein the clamp-plate assembly is pivotal relative to the base body about the adjustment mechanism.

* * * * *